Nov. 9, 1971  H. U. HAUSER-LIENHARD  3,618,165

MOLDING MACHINE FOR HANDLING EXPANDIBLE PLASTICS

Filed Feb. 25, 1969

INVENTOR.
Hans Ulrich Hauser-Lienhard
BY
ATTYS.

United States Patent Office 3,618,165
Patented Nov. 9, 1971

3,618,165
MOLDING MACHINE FOR HANDLING
EXPANDIBLE PLASTICS
Hans Ulrich Hauser-Lienhard, Zurich, Switzerland, assignor to Bucher-Guyer AG Maschinenfabrik, Zurich, Switzerland
Filed Feb. 25, 1969, Ser. No. 802,017
Claims priority, application Switzerland, Mar. 19, 1968, 4,037/68
Int. Cl. B29d 27/00
U.S. Cl. 18—5 P
4 Claims

ABSTRACT OF THE DISCLOSURE

A molding machine for handling expandible plastics and forming molded articles comprises a movable and a fixed mold carrier frame each carrying one mold half. The movable mold carrier frame is mounted within a movable cover member which can be moved in sealing contact with the other mold carrier frame to form a closed steam and water space around the closed mold. Means are provided to adjust the position of said mold carrier frame mounted within the movable cover member with respect to the cover member in mold opening and closing direction, so as to compensate the varying constructional height of different molds to be used in the machine.

Figure 1:
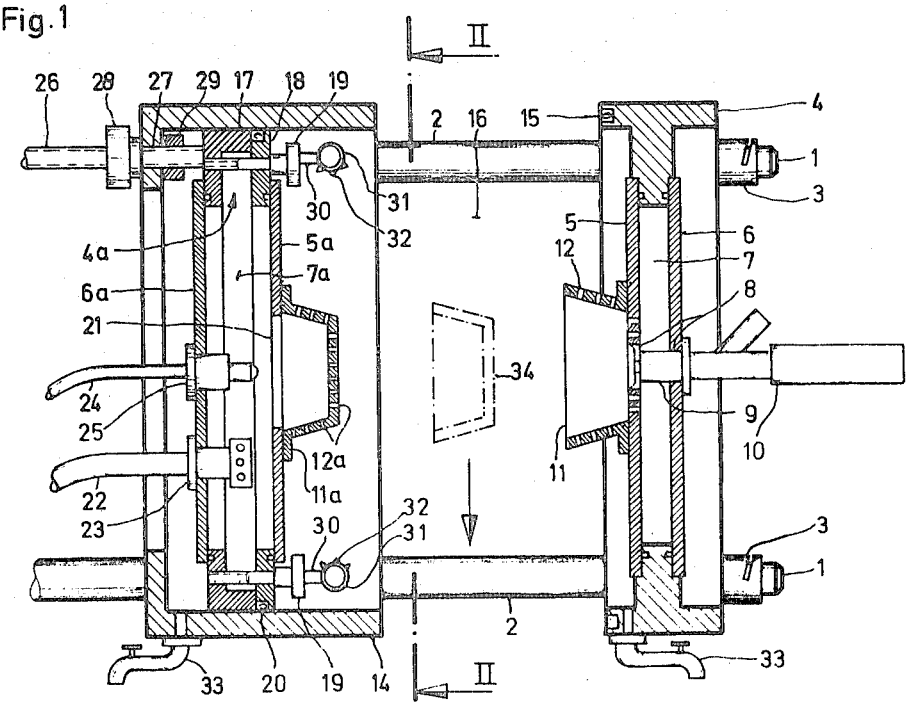

The invention relates to a molding machine for handling expandible plastics, and having at least one pair of mold carrier frames capable of being brought into a closed and an open position and each frame carrying a mold half, a cover member forming a steam and water space around the mold in the closed position being associated with said pair of mold carrier frames.

The molds employed in such molding machines are of varying heights according to the product to be made. This variation in the shape requires that the molding machine should be matched to the particular mold in use. In molding machines known up to the present this matching is achieved by altering the constructional height of a mold frame or of the cover or even by packing the mold. These solutions require appropriate removable extra components. Moreover, the time required for changing the moulds is long.

To overcome these disadvantages it is proposed according to the invention that the one of the mold carrier frames is arranged in the interior of said cover member, while the other mold carrier frame sealingly engages the cover member, in the closed position of said mold halves and that means are provided for adjusting the position of said mold carrier frames within the cover member in mold opening and closing direction relatively to said cover member and for locking it in adjusted position.

According to a particular preferred embodiment, the mold carrier frame which is disposed in the interior of the cover engages the cover itself along cylindrical engaging surfaces.

Figure 2:
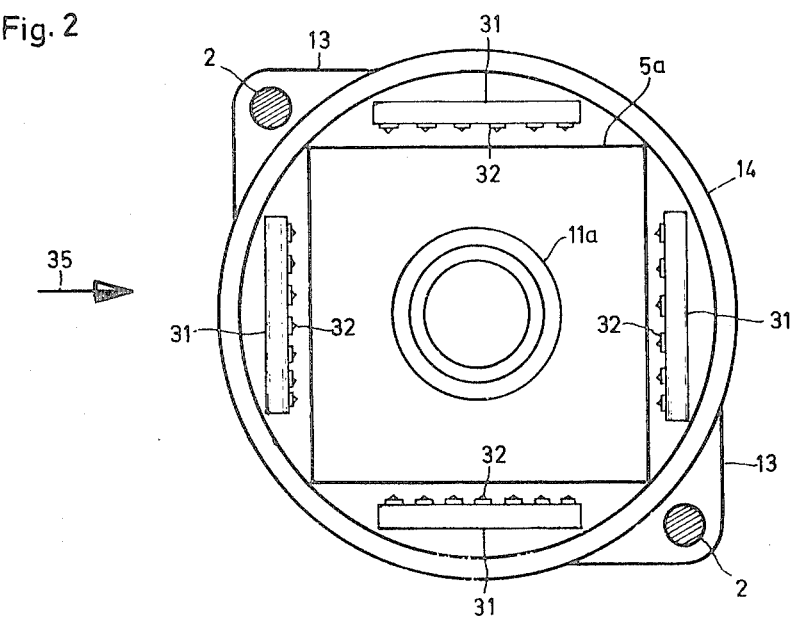

The invention is now further described by way of example in conjunction with an embodiment illustrated in the accompanying drawing. In the drawing:

FIG. is a diagrammatic illustration of a longitudinal vertical section through a molding machine of horizontal construction, and FIG. 2 is a cross-section through the molding machine on the line II—II of FIG. 1.

A fixed mold carrier frame 4 is anchored by means of nuts 3 on the threaded ends 1 of two horizontally arranged mutually parallel supporting bars 2. The frame 4 has the shape of a ring of T-shaped cross-section. A mold plate 5 and a connecting plate 6, which embrace a steam chamber 7, are secured to the inwardly directed web of this mold carrier frame 4. A connecting sleeve 9 for an injection nozzle 10 is inserted in coaxial bores 8 in the mold plate 5 and the connecting plate 6. A steam connection opening into the steam chamber 7 is omitted from the drawing in the interests of clartiy.

An outer mold half 11 is mounted on the mold plate 5 and both this mold half 11 and the plate 5 have a number of steam nozzles 12 for the passage of steam.

A cylindrical cover 14 having two projections 13 (FIG. 2) is movably mounted on the supporting bars 2 and is capable of being displaced axially by a ram assembly (not shown) from the open position illustrated in FIG. 1 into the mold-closing position. In this mold-closing position the face of the cover 14 lies against a seal 15 in the mold carrier frame 4, with which the cover 14 co-operates to form a steam and water space 16 shut off from the outside.

A mold carrier frame 4a made up of a ring 17 of angular profile and a ring 18 of rectangular profile is movably mounted in the interior of the cover 14 and where the two rings 17 and 18, held together by means of screws 19, meet, they pre-load an annular seal 20 in such a manner that the steam and water space 16 remains tightly sealed off at the point of engagement between the cover 14 and the mold carrier frame 4a.

A mold plate 5a and a connecting plate 6a form, together with the mold carrier frame 4a, a steam chamber 7a. Over an opening 21 in the mold plate 5a there is secured an inner mold half 11a traversed by steam nozzles 12a. In the connecting plate 6a there is inserted a steam supply connection 22 with a steam distributor 23 and a water supply connection 24 with a spray head 25. Uniformly distributed around the periphery of the ring 17 of the mould carrier frame 4a there are rigidly secured a number of threaded rods 26 of which only one (FIG. 1) is illustrated in the interests of clarity. These threaded rods 26 extend through bores 27 in the cover 14 and are capable of being locked in place by means of an adjusting nut 28 and a lock nut 29, and by this possibility of adjustment the position of the mold carrier frame 4a with reference to the cover 14 is adjustable.

Four water pipes 31 are mounted on the mold carrier frame 4a by means of retainers 30. These water pipes 31 fed through a central pipe system have spray nozzles 32, through which the mold can be sprayed with water for cooling the molded article.

When the machine is set up for a mold of a certain constructional height, then by adjusting the nuts 28 and the lock nuts 29 the mold carrier frame 4a is located on the cover 14 so that when the face of the cover 14 engages against the seal 15 of the mold carrier frame 4 the two mold halves 11 and 11a also just come into mutual engagement to define the mold.

The process of producing a molded article takes place in a fully automatically controlled sequence of movements as follows:

When the mold has closed the material to be handled, for example pre-expanded polystyrene granules, is injected through the injection nozzle 10 into the mold cavity formed by the two mold halves 11 and 11a. Then the polystyrene granules injected into the mold are subjected to the action of heat in the combined steaming and autoclave method. In a first phase it is acted on by steam by so-called shock steaming of the steam space 7a through the steam distributor 23, the seam entering under pressure into the mold space through the steam nozzles 12a and escaping through the steam nozzles 12 in the mold half 11 into the steam and water space 16. The exhaust steam and the condensate resulting from it is led away through a continuously adjustable discharge 33 connected to the steam and water space 16.

In a second subsequent steam treatment process, the so-called autoclave steaming, fresh steam is fed to the steam space 7 through a steam distributor (not illustrated), and in this case also the mold half 12 is enveloped in steam, so that the welding of the individual granules of material to each other is completed.

Finally, there follows in a cooling process the solidification of the polystyrene which has first been welded together under the action of heat. For this purpose the mold 11, 11a is sprayed with cold water through the water pipes 31 in the steam and water space 16, through the spray head 25 in the steam chamber 7a and through a further spray head (not shown) in the steam chamber 7. The water which collects in the bottom of the cover 14 is led away through an exhaust 33.

On the return movement of the cover 14 and of the mold carrier frame 4a which is rigidly secured to it, the mold halves 11 and 11a open and the finished molding 34, which must be ejected from one or other of the mold halves 11 and 11a by a mechanical or pneumatic ejecting device (not shown), can drop downwards into a collecting container which is placed ready.

The important advantage of the invention lies in the reduction of the preparation time required for changing the molds. Apart from the clamping of the mold halves 11 and 11a onto the mold plates 5 and 5a the relative position between the mold carrier frame 4a and the cover 14 can be set to match any desired mold height without the assistance of additional components.

Particular advantages of the machine illustrated are also given by the cylindrical shape of the mold carrier frames 4 and 4a and the cover 14. The machining of these components is cheaper. Moreover the cylindrical form of the cover 14 is also of advantage for the collection and discharge of the water sprayed in the cooling step.

That side from which the molding machine is operated is indicated by an arrow 35 in FIG. 2. As is also evident in this figure, the two carriers 2 are arranged so that the carrier 2 which is nearer to the operating side lies above while the other carrier lies diametrically opposite. In the open position of the molding machine, the space between the two mold carrier frames 4 and 4a is easily accessible, which simplifies the servicing of the machine.

Further embodiments of the proposed machine are also possible. For example the cover and the mold carrier frame which is adjustable relative to it could be mounted to be stationary on the bars, the second mold carrier frame being then necessarily mounted to be movable on the bars. Furthermore, it would be possible to arrange that one of the mold carrier frames in mounted directly slidably on the bars and the associated cover would then be adjustable on this mold carrier frame. In a molding machine of modular construction or rack construction at least two units comprising a cover and mold carrier frames would be present. In a vertical molding machine the carriers 2 would be arranged to be vertical but without affecting anything in the features of the invention.

What is claimed is:

1. A molding machine for handling expandable plastic materials comprising a pair of mold carrier frames arranged for relative movement between a closed position and an open position, a mold half carried by each of said mold carrier frames, a cover member associated with one of the mold carrier frames, said cover member forming a steam and water space around the mold in said closed position, one of said mold carrier frames being disposed within said cover member, means including a cylindrical engagement surface on said cover member for adjusting said one mold carrier frame with respect to said cover member, means providing sealing contact between the other of said mold carrier frames and said cover member in said closed position, and means for adjusting the position of said one mold carrier frame in said mold closing and opening positions relative to said cover member and for locking said one mold carrier frame in adjusted position.

2. The molding machine of claim 1 which includes fixed supporting bars for guiding said one mold cover member and said mold carrier frame as a unit therealong, and said mold cover member being mounted on threaded rods with locking nuts thereon to permit adjustment of the position of said mold carrier frame relative to said one mold cover member.

3. The molding member of claim 1 in which said one mold carrier frame is made up of two spaced ring members held together by screws.

4. The molding machine of claim 3 in which one of said ring members carries a mold plate having one mold half secured thereto, and the other ring member carries a closure plate, said mold plate and said closure plate together with said ring member defining a sealed steam chamber, said closure plate carrying steam and water supply connections leading into said chamber.

References Cited
UNITED STATES PATENTS

| | | | |
|---|---|---|---|
| 2,723,423 | 11/1955 | Kyle | 18—5 M |
| 2,876,492 | 3/1959 | Frieder | 18—5 M |
| 3,375,309 | 3/1968 | Stevens | 18—5 P X |

J. SPENCER OVERHOLSER, Primary Examiner

N. E. LEHRER, Assistant Examiner